June 11, 1929.  H. E. McCRAY  1,717,163
SELECTIVE SPEED TRANSMISSION MECHANISM
Filed June 8, 1927  4 Sheets-Sheet 1

Witness
Milton Lenoir

Inventor.
Harold E. McCray.
John L. Jackson.
By
Attorney.

June 11, 1929.  H. E. McCRAY  1,717,163
SELECTIVE SPEED TRANSMISSION MECHANISM
Filed June 8, 1927    4 Sheets-Sheet 2
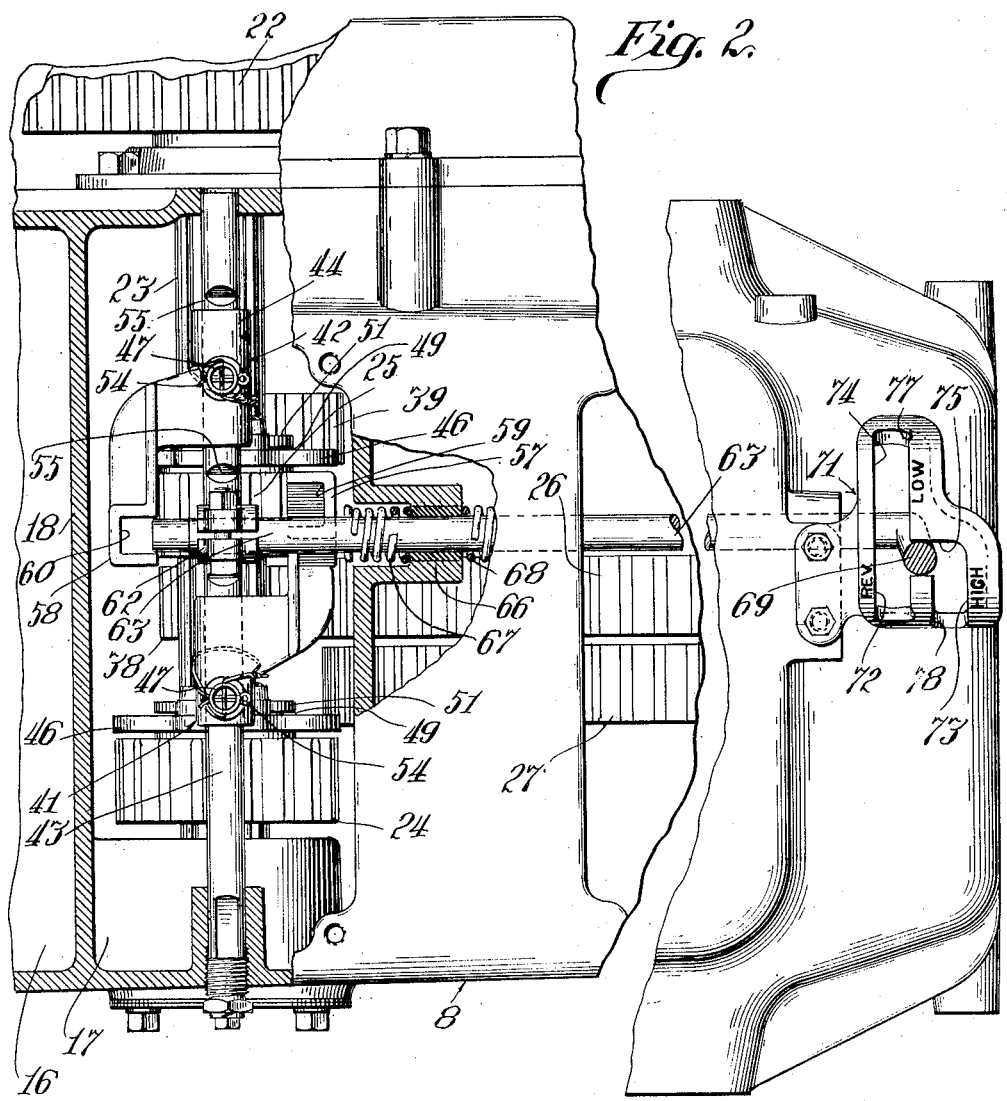

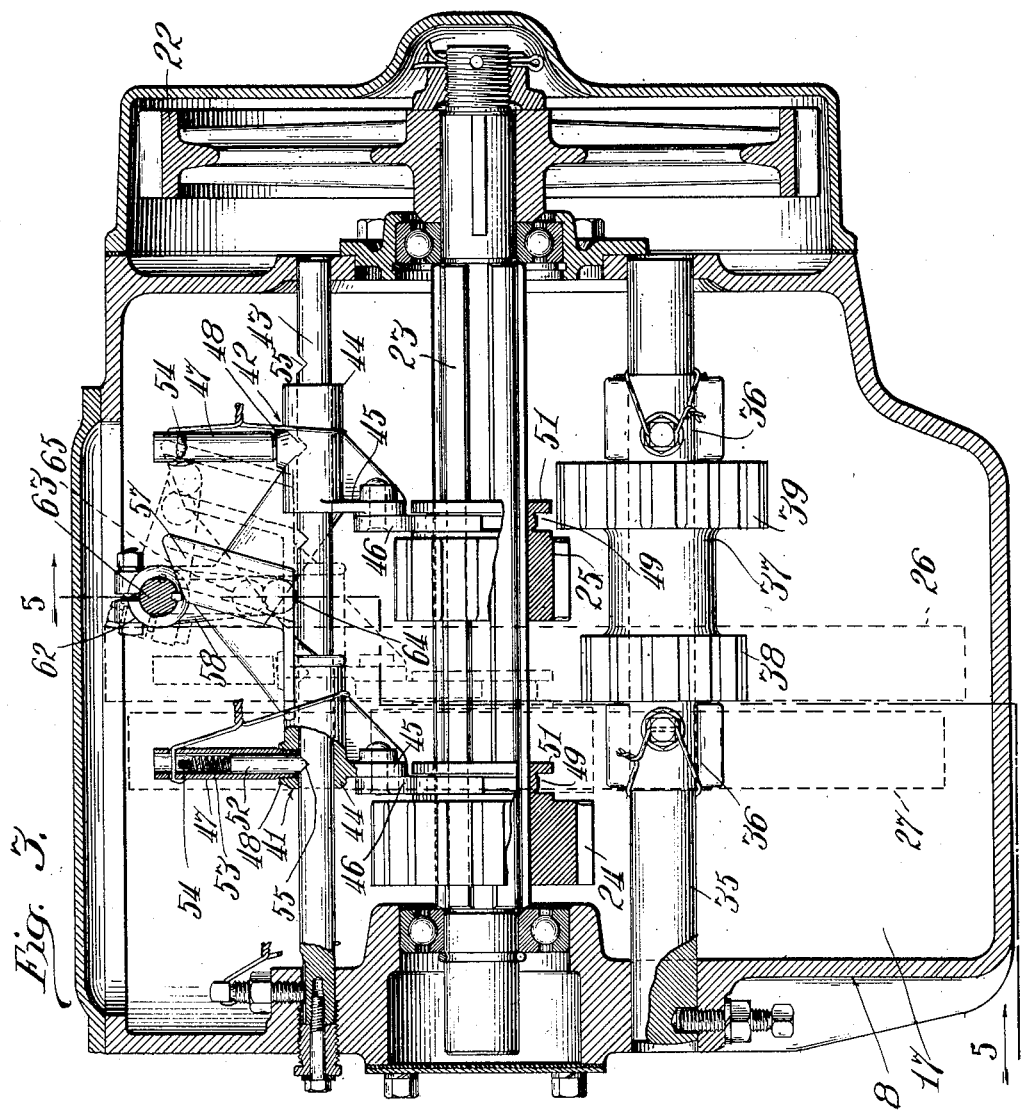

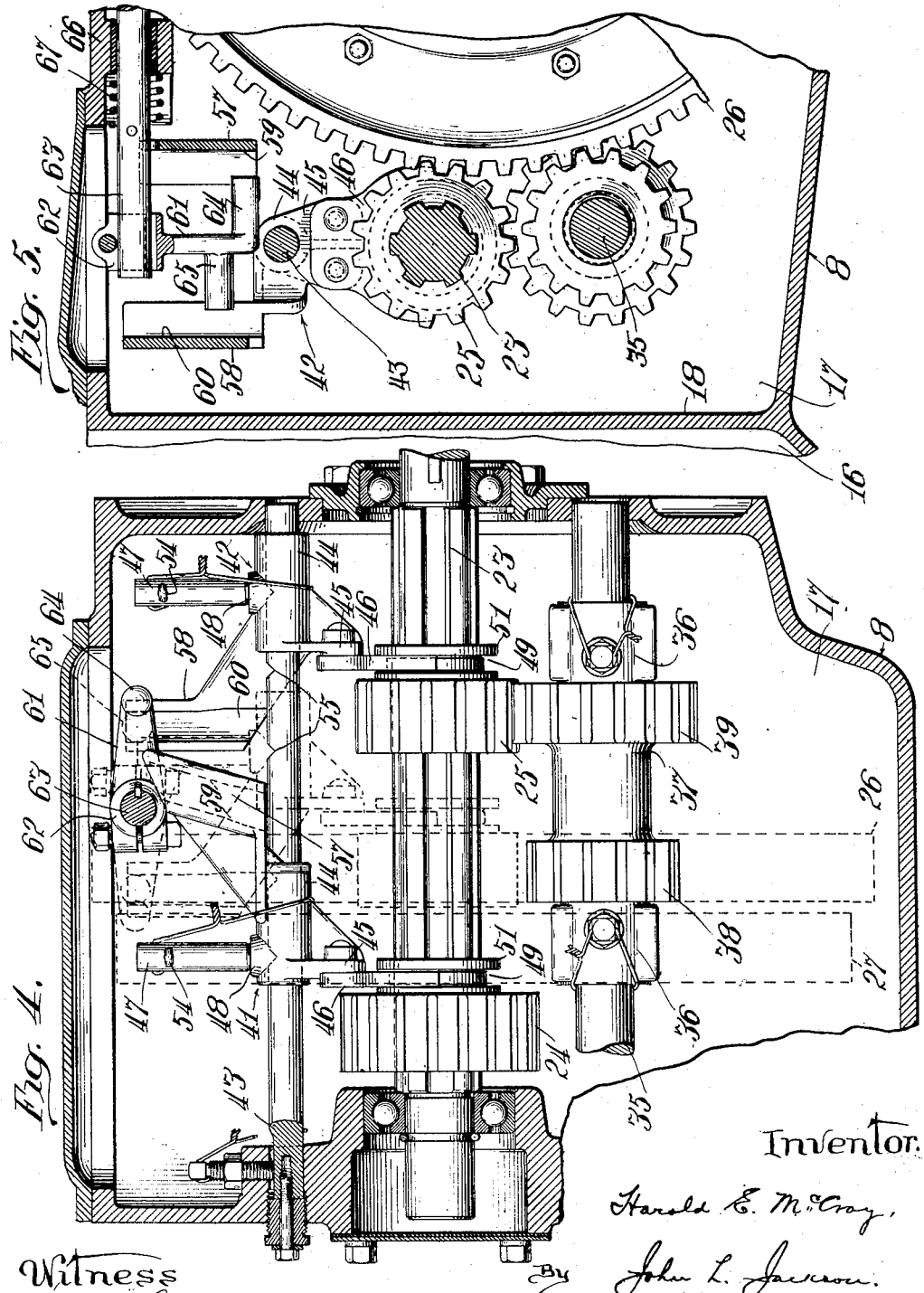

Patented June 11, 1929.

1,717,163

UNITED STATES PATENT OFFICE.

HAROLD E. McCRAY, OF WATERLOO, IOWA, ASSIGNOR TO JOHN DEERE TRACTOR COMPANY, OF WATERLOO, IOWA, A CORPORATION OF IOWA.

SELECTIVE-SPEED-TRANSMISSION MECHANISM.

Application filed June 8, 1927. Serial No. 197,311.

The present invention relates to selective speed transmission mechanisms such as are employed for obtaining different speeds of forward drive and a reverse drive in self-propelled vehicles etc.

The invention is concerned primarily with the gear shifting mechanism, and particularly the shifter members and the lever for actuating the same, and it has as its fundamental object to provide an improved construction and arrangement of such parts which will positively prevent the possibility of any of the shiftable gears accidently working out of driving position after one of these gears has been moved to such position.

The invention has been devised as an improvement upon the construction of transmission mechanism disclosed in the copending application of Louis W. Witry, Serial No. 682,401, filed December 24, 1923. The transmission mechanism disclosed in this copending application has particular application to farm tractors, such being the use in which it is shown in said application. Owing to the long pulling intervals when the transmission is operating under heavy duty, and to the severe jolting and vibration of the transmission mechanism in this type of vehicle, it frequently happens that the shiftable gear which is then in driving duty will shift or work out of driving position. The conventional spring plungers and like detents usually associated with the shifting elements are inadequate to prevent this disengagement. The present invention overcomes such difficulty by establishing an interlocking or dead center relation between the shifting lever and the shifter members which is positive in its action of holding the driving gear in its driving position.

While the invention has its greatest utility in transmission mechanisms for tractors, for the reasons stated above, it will be understood that it may also be incorporated in other types of transmission mechanisms for other vehicles. Referring to the accompanying drawings wherein I have shown the invention embodied in a tractor type of transmission of the construction disclosed in the above copending application:

Fig. 2 is a plan view of the same on a larger scale, the intermediate portion of the driving mechanism being broken away.

Fig. 3 is a transverse vertical sectional view taken on the plane of the line 3—3 of Figure 1.

Fig. 4 is a similar sectional view, illustrating the shifter parts in a different position, and Fig. 5 is a sectional view at right angles to Figure 3, taken on the plane of the line 5—5 thereof.

Figure 1:
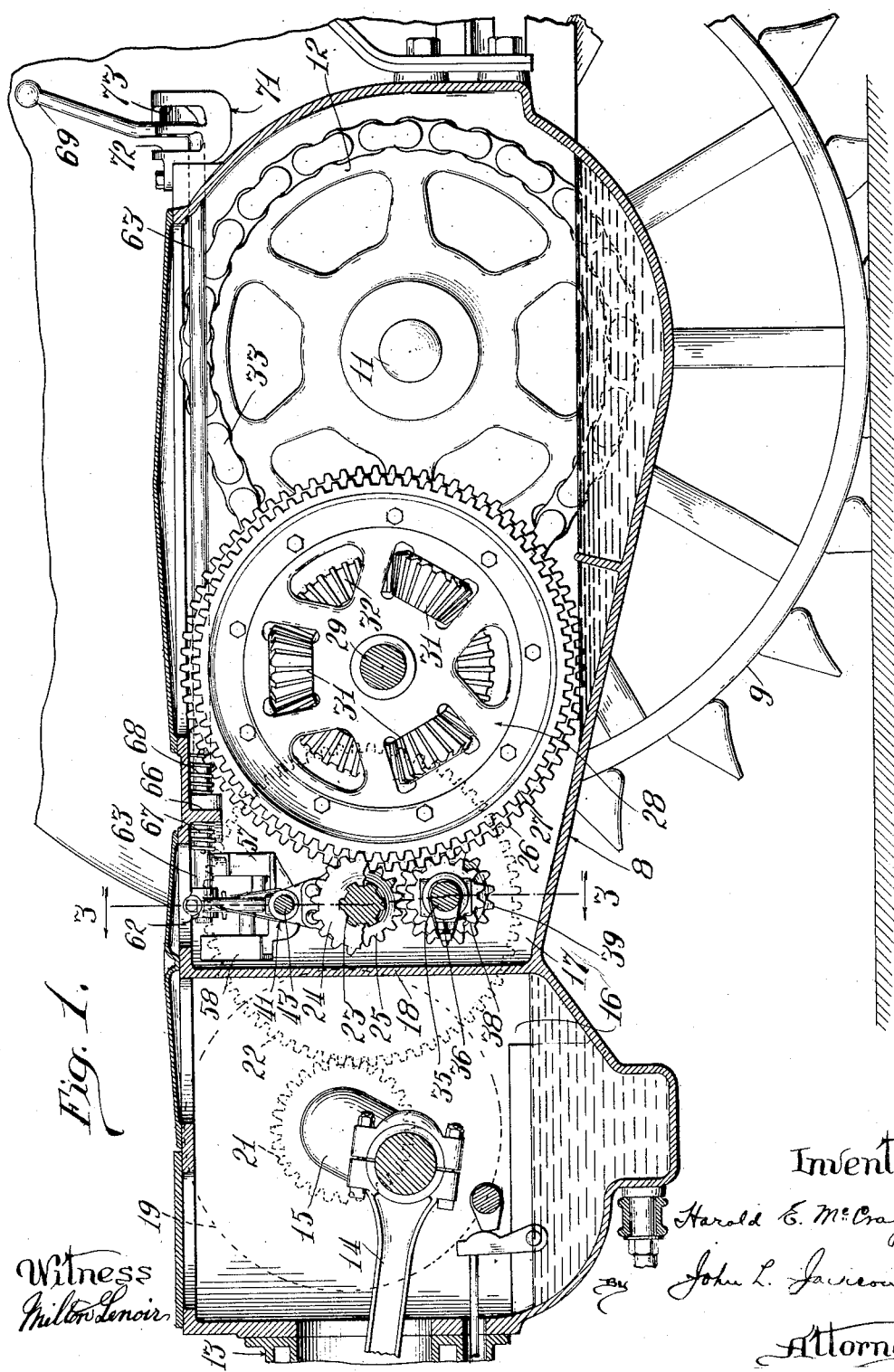
Figure 1 is a longitudinal vertical sectional view through the rear portion of the tractor, illustrating the general relation of the transmission mechanism, the operator's control lever etc.

I shall first describe in brief so much of the tractor structure and the driving apparatus as will facilitate the understanding of the present transmission mechanism. This transmission mechanism is enclosed in a housing 8 which also contains the differential mechanism and the driving means for driving the rear wheels of the tractor. Such wheels are indicated at 9, and are mounted on axles 11 which enter the sides of the housing, where they are provided with relatively large sprocket wheels 12. The engine 13, which is shown as being of the horizontal type, is bolted to the front end of the housing and has its cranks 14 entering this housing for connection with a crank shaft 15. The crank shaft is journaled in the side walls of a crank case compartment 16 which is separated from the rear compartment 17 by a partition 18. On the outer side of the crank case compartment the crank shaft 15 carries a suitable clutch, indicated in dotted lines at 19, through which power is transmitted to a spur gear 21. This spur gear meshes with a large spur gear 22 mounted on the outer end of a transversely extending drive shaft 23 (Fig. 3) which has suitable bearing support in the side walls of the housing in rear of the partition 18. Splined for sliding movement on the shaft 23 are two shiftable gears 24 and 25 through which the speed selections and the reverse drive are effected. The larger gear 24 represents the high speed gear through which a high speed forward drive is transmitted and a small gear 25 represents a low speed and reverse gear through which the low speed and reverse drives are transmitted. These gears are adapted to mesh selectively with two large spur gears 26 and 27 which constitute the outer driving element of a differential mechanism 28. The differential mechanism is of any conventional type, being mounted on two alined shaft sections 29. In the construction shown, the two gears 26 and 27 have a common web which is apertured and formed with journal portions for mounting bevel pinions 31 which mesh with bevel gears 32 secured to the inner ends of the shaft sections 29, these bevel gears 32 meshing upon opposite sides of the pinions 31. The outer ends of the shaft sections 29 carry small sprocket wheels (not shown) over which pass driving chains 33 having driving engagement with the large sprocket wheels 12 on the rear axles 11.

Referring again to Figs. 3 and 4, it will be observed that below the drive shaft 23 is mounted a stationary shaft 35 having its ends mounted in the side walls of the housing. Journaled on this shaft between stop collars 36 is a sleeve 37, on one end of which is a spur pinion 38 and on the other end of which is a slightly larger spur gear 39. The pinion 38 is in constant mesh with the large driven gear 26, and the low speed and reverse gear 25 is adapted to be slid into mesh with the larger gear 39 when a reverse drive is desired. When the transmission is in its normal or neutral condition the two shiftable gears 24 and 25 stand in the positions shown in Fig. 3, the gear 24 being out of mesh with the driven gear 27, and the gear 25 being out of mesh with the other driven gear 26 and out of mesh with the reverse gear 39. The two shiftable gears 24 and 25 are arranged to be shifted through the instrumentality of shiftable members or forks 41 and 42, both of which have slidable mounting on a fixed rod or shaft 43 disposed above the drive shaft 23 and supported at its ends in the side walls of the housing. Each of these gear shifters comprises a sleeve 44 fitting slidably on the shaft 43; a depending bracket 45 to which is riveted the shifting fork proper, designated 46; and a sleeve 47 which is screwed into a threaded boss 48 extending from the upper side of the horizontal sleeve 44. The fork members 46 extend into annular grooves 49 formed in collars 51 at the sides of the gears 24 and 25. Within each of the vertical sleeves 47 is mounted a dog 52 pressed downwardly by a spring 53, the upper end portion of which abuts against a pin 54 extending through the upper portion of the sleeve 47. The lower end of each dog or detent plunger 52 tapered to adapt it to fit in one or another of several notches 55 formed in the rod 43 in operative relation to each of the sleeves 44. The purpose of the detent plungers 52 and notches 55 is to yieldingly lock the shifter members either in operative or inoperative position. From the foregoing description it will be understood that the gear shifter 41 is movable along the rod 43 to shift the gear 24 from its neutral position into mesh with the driven gear 27, and that when in either of its above described positions said gear shifter will be yieldingly held in such position by means of the plunger 52 engaging in one of the notches 55. Two of such notches are provided in connection with this gear shifter 41, one of such notches corresponding to the neutral position of such gear shifter and the other corresponding to the operative or driving position. In like manner, the gear shifter 42 is movable along the rod 43 to shift the gear 25 from its neutral position either into engagement with the driven gear 26, or into engagement with the reverse gear 39, and when in any of its positions said gear shifter will be yieldingly held in such position by means of its detent plunger 52 engaging in one of the notches 55. Three of such notches are provided in connection with the shifter 42, since the latter is movable into three positions.

Carried by the two shifters 41 and 42 are arms 57 and 58 respectively, which are set inwardly from the inner ends of the shifters and are joined thereto by suitable webs. These arms are offset fore and aft from opposite sides of the guide rod or shaft 43, as best shown in Figs. 2 and 5, and formed in their inner opposing surfaces are grooves 59 and 60. It will be observed that the arm 57 and its groove 59 are inclined, and the arm 58 and its groove 60 are substantially vertical. The opposite side walls of each of these grooves constitute thrusting surfaces through which shifting motion is imparted to the shifter and to the associated gear.

The desired transmission selecting operations are effected through a lever 61 which has a split hub 62 clamped and keyed to a longitudinally extending shaft 63, through which the lever is reciprocated and rocked. Referring to Fig. 5, the lever has two pins 64 and 65 projecting from opposite sides thereof at different points along the lever. The pin 64 is adapted to engage in the groove 59 of the high speed shifter 41, and the pin 65 is adapted to engage in the groove 60 of the low speed and reverse shifter 42. These pins are of such length that when the lever 61 is in its intermediate or neutral position they project slightly into the opposite grooves 59 and 60, but by moving the lever toward one or the other of the arms 57—58, one of the pins is caused to move further into the groove of its associated shifter, at the same time moving the other pin clear of the groove of the opposite shifter.

The operating rod or shaft 63 extends longitudinally back through the upper portion of the housing 8. Adjacent to its forward end, this shaft has rotatable and reciprocable support in a bearing boss 66 which extends down from the top wall of the housing 8. Springs 67 and 68 at opposite sides of this bearing boss bear against pins in the shaft and yieldingly hold the shaft against endwise movement, thus tending to restore it to its normal or neutral position. The rear end of the shaft extends out from the rear portion of the housing 8 where it is provided with an operator's lever 69. This lever, by which the shaft 63 may either be moved longitudinally or rocked in either direction, is guided by a bracket 71 having a Y slot therein, i. e. said slot comprises two parallel spaced slots 72 and 73 extending down on one side of the bracket 71 and an oppositely extending slot 74 formed in continuation of the slot 72 (Fig. 2). The slot 73 is cross connected with the other slots 72 and 74 by a short slot 75. The lever 69, which is disposed in proximity to the operator's seat, is adapted to move in the slots, and when in its neutral position lies in the slot 75. In the arrangement shown, forward thrusting movement given the lever 69 will cause the shifting lever 61 to move forwardly and engage the gear shifter 42, at the same time clearing the pin 64 from the other gear shifter 41. By now rocking the lever 69 to the right as viewed in Fig. 2, the gear shifter 42 will be moved longitudinally of the rod 43 to carry its gear 25 into engagement with the large driven gear 26, thus providing for a forward drive at slow speed. The other gear shifter 41 will remain in its neutral position, being held there by its spring pressed detent 52. Rocking of the lever 69 in the opposite direction, down into the reverse gear slot 72, will move the gear shifter 42 in the opposite direction, thereby causing the driving gear 25 to mesh with the reverse gear 39 on the countershaft 35 and providing for reverse drive. Similarly, by pulling the lever 69 backwardly and rocking it down into the high speed slot 73, the shifting lever 61 will be caused to engage the groove 59 of the shifter 41 and said gear shifter will be moved to the right as viewed in Fig. 3, thereby causing the driving gear 24 to engage the driven gear 27 and providing for forward drive at high speed.

As before described, the two shiftable gears 24 and 25 are yieldingly held in their neutral positions and in their respective driving positions through the action of the spring pressed plungers 52. This yieldable restraint of the gears is augmented through the provision of notches in the bracket 71 for receiving the operating lever 69. Referring to Fig. 2, it will be seen that in the lower extremity of the low speed slot 74 a notch 77 is formed in the rear wall of this slot. At the extremity of the high speed slot 73, a notch 78 is formed in the front wall of the slot. If desired, a similar notch may be formed at the extremity of the reverse slot 72, in which case this notch will be formed in the rear wall of said slot. When the operator's lever is pushed forwardly for movement into the low speed slot 74 the spring 68 is compressed, and hence when the lever is rocked down to the end of this low speed slot, the pressure of this spring forces the lever backwardly into the notch 77. Similarly, when the lever 69 is pulled rearwardly for movement into the high speed slot, the opposite spring 67 is compressed, and when the lever is moved downwardly into the bottom of this high speed slot the pressure of such spring will cause the lever to engage in the notch 78. Thus two sets of devices are provided for yieldingly holding the shiftable gears in their neutral and driving positions, one of these sets of devices consisting of the detent plungers 52, and the other consisting of the notches 77—78 and the springs 67—68.

While these two sets of devices are usually adequate for holding the shiftable gears in their proper positions, owing to the heavy pulling, jolting and other adverse conditions encountered in tractor use, I have found it desirable to provide for positively interlocking or holding these gears in their proper positions, so that there is no possibility of the gear which is in driving duty moving out of its proper mesh. Referring to Fig. 4, it will be noted that the grooved arm 58 of the shifter 42 extends up to and slightly beyond the horizontal plane of the axis of the operating shaft 63. When the shifter 42 is in the position of reverse drive the arm 58 occupies the position shown in full lines, and when this shifter is in the position of low speed forward drive, such arm occupies the position illustrated in dotted lines. Inasmuch as this arm is disposed forwardly beyond the end of the shaft 63 its upper end can move from one side to the other of the shaft, as shown. The low speed slot 74 in the bracket 71 is made sufficiently long so that when the operator's lever is rocked down to the bottom of the slot the shifting lever 61 will assume a position extending substantially horizontally from the axis of the shaft 63, this low speed position corresponding to the dotted line position of the lever in Fig. 4. With the parts in this position it will be noted that the axis of the lever 61 extends at right angles to the vertical plane of the groove 60. Thus the groove 60 and the pin 65 of the lever occupy a dead center relation whereby any reacting stresses tending to shift the gear 25 out of mesh with the gear 26 will be transmitted to the lever 61 as a straight radial thrust which is incapable of causing the lever to rotate. If desired, the parts may be so proportioned that the pin 65 will move upwardly, slightly beyond this dead center position, so that such reacting stresses will merely tend to force the operator's lever 69 down against the bottom of the low speed slot 74. Irrespective of the degree of angular movement of the lever 61, the important consideration is that when the gear is in its low speed position the axis of the lever 61 and the plane of the thrusting surfaces of the groove 60 will extend at an angle of approximately 90° to each other, so that any shifting forces set up in the gear and in the shifter will act radially of the lever 61, instead of acting as moment arms tending to revolve the lever.

Referring now to Fig. 3, it will be observed that this same interlocking or dead center relation occurs between the lever 61 and the grooved arm 57 when the driving gear 24 is in the position of high speed drive. The movement of the arm 57 is confined to one side of the shaft 63, this arm occupying the position indicated in dotted lines when the associated gear 24 is in driving position. The length of the slot 73 in the bracket 71 is so proportioned that when the operator's lever is swung down to the bottom of this slot the shifting lever 61 will assume the inclined position indicated approximately in dotted lines in Fig. 3. Such inclination of the lever places its axis at right angles to the groove 59 in the arm 57. Thus any reacting stresses tending to move the gear 24 out of mesh with the gear 27 will be transmitted through the thrusting surfaces of the groove 59 to the shifting lever 61 as radially extending stresses, which will be incapable of causing the lever to rotate.

The same interlocking or dead center relation may also be provided for the reverse drive position of the shifter 42, although this is not so important, as it is very seldom that the tractor is ever driven in reverse direction for any appreciable distance. Such interlocking relation for reverse drive is indicated by the full line position of the shifter 42 and lever 61 in Fig. 4. It will be noted that in this position of the shifter and lever the pin 65 is also at a dead center point with respect to reactive stresses imparted thereto through the thrusting surfaces of the groove 60. The spring pressed engagement of the operator's lever 69 with the detent shoulders or notches 77 and 78 in the guide bracket 71 serves to hold the shifting lever 61 in each of the previously described interlocking positions.

From the foregoing it will be seen that I have provided a construction and arrangement of shifter mechanism whereby the shiftable gear which is in driving position is positively locked against all conditions and forces which might tend to unmesh this gear. While the particular construction and proportions shown are preferred for attaining this end, nevertheless it will be understood that other equivalent constructions and proportions may also be employed without departing from the invention.

What I claim as my invention and desire to secure by Letters Patent, is:—

1. In a selective speed transmission mechanism, the combination of speed change gearing comprising a rotatable driving member, a shifting member for moving said driving member between neutral and driving positions, said shifting member comprising a thrusting surface, and a lever movable into and out of operative relation to said shifting member and adapted to impart movement thereto through said thrusting surface, said lever extending substantially at right angles to said thrusting surface when said driving member is in driving position.

2. In a selective speed transmission mechanism, the combination of speed change gearing comprising a shiftable gear, a shifting fork for moving said gear between neutral and driving positions, said shifting fork comprising a thrusting surface, and a lever movable into and out of operative engagement with said shifting fork and adapted to impart movement thereto through said thrusting surface, said lever being arranged to move to a dead center position with respect to said thrusting surface when said gear is moved to driving position.

3. In a selective speed transmission mechanism, the combination of speed change gearing comprising a shiftable gear, a shifting fork for moving said gear between neutral and driving positions, said shifting fork comprising a thrusting surface, and a lever adapted to have selective engagement with said shifting fork and to impart movement thereto through said thrusting surface, the proportions and the movements of said thrusting surface and said lever being such that said lever extends substantially at a right angle to said thrusting surface when said gear is in driving position.

4. In a selective speed transmission mechanism, the combination of change speed gearing comprising two shiftable driving members, separate shifting members for moving each of said driving members between neutral and driving positions, each of said shifting members comprising a thrusting surface, and a lever adapted to engage selectively with said shiftable members and to impart movement thereto through said thrusting surfaces, said lever, when cooperating with either of said shifting members, moving to a position substantially at right angles to the thrusting surface thereof when the driving member associated with said shifting member is in driving position.

5. In a selective speed transmission mechanism, the combination of change speed gearing comprising two shiftable gears, separate shifting forks for moving each of said gears between neutral and driving positions, each of said shifting forks comprising a thrusting surface, and a lever adapted to engage selectively with said forks and to impart movement thereto through said thrusting surfaces, said lever, when cooperating with either of said shifting forks, moving to a substantially dead center position with respect to the thrusting surface of said fork when the gear associated therewith is in driving position.

6. In a selective speed transmission mechanism, the combination of speed change gearing comprising two shiftable gears, separate shifting members for moving each of said gears between neutral and driving positions, grooves in said shifting members, and a lever adapted to engage selectively in said grooves and adapted to impart movement therethrough to said shifting members, said lever when cooperating with either of said shifting members moving to a position substantially at right angles to the groove therein when the gear associated with said shifting member is in driving position.

7. In a selective speed transmission mechanism, the combination of speed change gearing comprising two shiftable gears, separate shifting forks for moving each of said gears between neutral and driving positions, arms carried by said shifting forks, and a lever adapted to be reciprocated to engage selectively with said arms and to be rocked to impart shifting movement to said forks through said arms, said lever, when cooperating with either of said shifting forks, moving to a dead center position with respect to the arm of said fork when the gear associated therewith is in driving position.

8. The combination with a tractor comprising a housing extending longitudinally thereof, of selective speed transmission mechanism in said housing comprising a driving shaft extending transversely of said housing and having its ends journaled in the side walls thereof, a pair of shiftable gears mounted on said driving shaft, separate shifting members operatively connected to said gears, each of said shifting members comprising a thrusting surface, an operating shaft extending longitudinally of said housing, and a lever on said operating shaft adapted to be moved into selective engagement with said shifting members by longitudinal movement of said operating shaft and to impart shifting movement to said members through said thrusting surfaces by rocking movement of said shaft, said lever, when cooperating with either of said shifting members, moving to a dead center position with respect to the thrusting surface of said member when the gear associated therewith is in driving position.

9. The combination with a tractor comprising a housing extending longitudinally thereof, of selective speed transmission mechanism of said housing comprising a driving shaft extending transversely of said housing and having its ends journaled in the side walls thereof, a pair of shiftable gears mounted on said driving shaft, each of said shiftable gears comprising a grooved collar on one side thereof, a guide rod extending substantially parallel with said driving shaft, two shifting forks mounted on said guide rod and operatively engaging in the grooved collars on said gears, arms carried by said shifting forks, grooves in the opposing sides of said arms, an operating shaft extending longitudinally of said housing and having reciprocable and rocking movements, and a lever on said shaft comprising oppositely extending pins adapted to engage selectively with the grooves in said arms in the reciprocating movement of said operating shaft, said pins imparting shifting movement to the selected fork in the rocking movement of said shaft, said lever, when cooperating with either of said shifting forks, moving to a position to dispose the radial plane of the pin engaging with said fork substantially at right angles to the groove in the arm of said fork.

10. In a selective speed transmission mechanism, the combination of change speed gearing comprising two shiftable gears, shifting members for moving each of said gears between neutral and driving positions, an operating shaft, means for establishing operative connection between said shaft and said shifting members, an operating lever rigid with said shaft and moving directly therewith, a bracket comprising slots in which said lever has its shifting movement, notches formed in the sides of two of said slots adjacent to their ends, and spring means operating through said shaft to force said lever into said notches when said lever is moved to the end of either of said slots.

11. In a selective speed transmission mechanism, the combination of change speed gearing comprising two shiftable gears, shifting forks for moving each of said gears between neutral and driving positions, an operating shaft, means for establishing operating connection between said shaft and said shifting forks, an operating lever rigid with said shaft and moving directly therewith, a bracket comprising two parallel slots and a connecting slot, said lever having its shifting movement guided in said slots, notches in opposite sides of said slots adjacent to the ends thereof, and a pair of springs on said shaft acting in opposition to resist movement of said lever from said connecting slot, said springs causing said lever to engage yieldingly in said notches when said lever is moved to the end of either of said parallel slots.

12. In a selective speed transmission mechanism, the combination of speed change gearing comprising a rotatable driving member, a shifting member for moving said driving member between neutral and driving positions, and a lever movable into and out of operative engagement with said shifting member to impart movement thereto and to establish an interlocking relation with said shifting member for positively locking said driving member in driving position.

13. In a selective speed transmission mechanism, the combination of speed change gearing comprising two shiftable gears, separate shifting members for moving each of said gears between neutral and driving positions, and a lever adapted to engage selectively with said shifting members and to impart shifting movement thereto, said lever being arranged to establish a locking relation with the selected shifting member when the shifting gear is in driving position for positively locking said gear in such position.

HAROLD E. McCRAY.